(12) United States Patent
Martins Araújo

(10) Patent No.: US 12,326,193 B2
(45) Date of Patent: Jun. 10, 2025

(54) SEALING RING FOR RADIALLY ENGAGING AN OUTER SURFACE OF A ROTARY SHAFT

(71) Applicant: Robert Bosch GmbH, Stuttgart (DE)

(72) Inventor: Nuno Alexandre Coelho Martins Araújo, Guimarães (PT)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 18/298,965

(22) Filed: Apr. 11, 2023

(65) Prior Publication Data

US 2023/0358315 A1   Nov. 9, 2023

(30) Foreign Application Priority Data

Apr. 13, 2022 (EP) .................................. 22168228

(51) Int. Cl.
*F16J 15/3232* (2016.01)
*F16J 15/3252* (2016.01)

(52) U.S. Cl.
CPC ....... *F16J 15/3232* (2013.01); *F16J 15/3252* (2013.01)

(58) Field of Classification Search
CPC .... F16J 15/3232; F16J 15/3252; F16J 15/442; F16J 15/441; F16J 15/4478; F05D 2240/55
See application file for complete search history.

(56) References Cited

U.S. PATENT DOCUMENTS

| | | | | |
|---|---|---|---|---|
| 3,200,615 A | * | 8/1965 | Stokely | F16J 15/3232 464/130 |
| 3,640,540 A | * | 2/1972 | Larsson | F16J 15/3456 277/576 |
| 4,243,232 A | | 1/1981 | Repella | |
| 5,695,201 A | * | 12/1997 | Wheeler | F16J 15/3236 277/944 |
| 5,957,461 A | * | 9/1999 | Ulrich | F16J 15/3224 384/138 |
| 2003/0102634 A1 | | 6/2003 | Friend et al. | |
| 2009/0152779 A1 | | 6/2009 | Imoto et al. | |
| 2013/0279834 A1 | * | 10/2013 | Willaczek | F16J 15/3236 384/147 |
| 2014/0161619 A1 | * | 6/2014 | Jacquemont | F16J 15/3456 416/223 R |
| 2019/0285180 A1 | * | 9/2019 | Watling | F16J 15/3252 |

(Continued)

FOREIGN PATENT DOCUMENTS

| | | |
|---|---|---|
| CN | 101741165 A | 6/2010 |
| EP | 0 648 961 A1 | 4/1995 |

(Continued)

*Primary Examiner* — Eugene G Byrd
(74) *Attorney, Agent, or Firm* — Maginot, Moore & Beck LLP

(57) ABSTRACT

A sealing ring for radially engaging an outer surface of cylindrical element, in particular a rotary shaft, is disclosed. The sealing ring includes a ring base body having a central rotating axis. The sealing ring further includes a first lip and a second lip that each extend from the ring base body to sealingly engage the rotary shaft. The sealing tips of both sealing lips point at least in part in the same axial direction. The first lip surpasses the second lip in axial direction such that the sealing tip of the first lip is arranged axially distanced to the second lip.

17 Claims, 3 Drawing Sheets

(56) References Cited

U.S. PATENT DOCUMENTS

| | | | |
|---|---|---|---|
| 2020/0292080 A1* | 9/2020 | Tokunaga | F16J 15/166 |
| 2020/0309269 A1* | 10/2020 | Aerts | F16J 15/3268 |
| 2021/0270372 A1* | 9/2021 | Koch | F16J 15/3232 |

FOREIGN PATENT DOCUMENTS

| | | | | |
|---|---|---|---|---|
| EP | 2 123 953 A1 | | 11/2009 | |
| EP | 2 647 752 A1 | | 10/2013 | |
| JP | 2018168998 A | * | 11/2018 | |
| JP | 2019082243 A | * | 5/2019 | |
| JP | 2019100398 A | * | 6/2019 | |
| JP | 2020063846 A | * | 4/2020 | F16C 19/26 |
| JP | 2021173336 A | * | 11/2021 | |

* cited by examiner

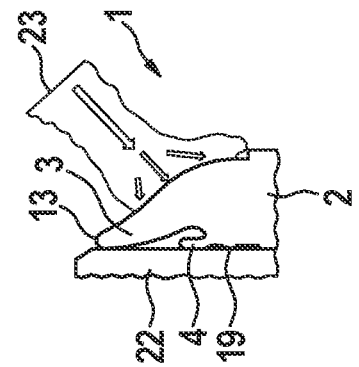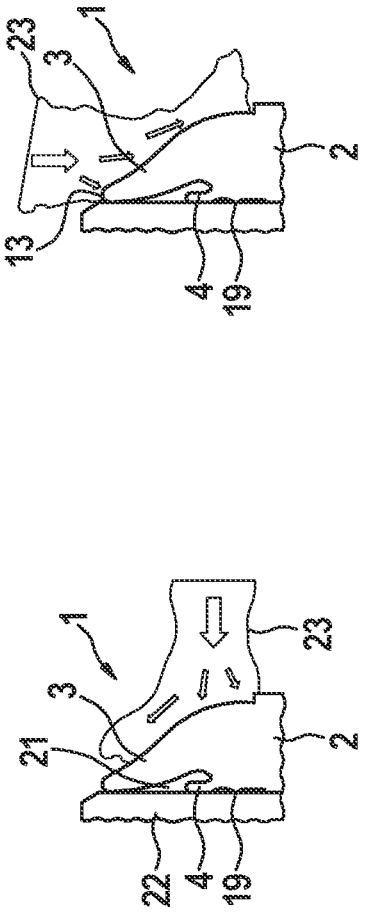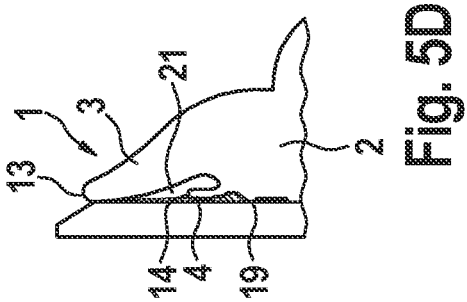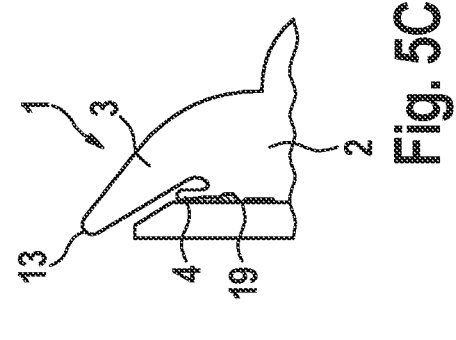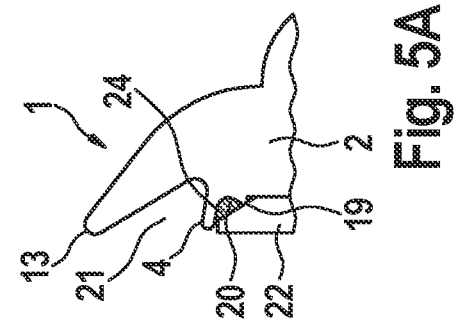

SEALING RING FOR RADIALLY ENGAGING AN OUTER SURFACE OF A ROTARY SHAFT

This application claims priority under 35 U.S.C. § 119 to patent application no. EP 22168228.9, filed on Apr. 13, 2022 in Europe, the disclosure of which is incorporated herein by reference in its entirety.

The present disclosure pertains to a sealing ring for radially engaging an outer surface of a cylindrical element, in particular a rotary shaft, comprising a ring base body having a central rotation axis, further comprising a first lip and a second lip that each extend from the ring base body to sealingly engage the cylindrical element.

BACKGROUND

Sealing rings as described above are known from the prior art, for example from patent application US 2003-010-2634 A1. Sealing rings for radial engagement with a rotary shaft are used in applications to create a seal between, for example, a fixed or a movable, in particular rotating member such as a rotary shaft. The sealing ring is used to prevent lubrication fluid from leaking from a housing that supports the rotary shaft and to prevent dirt particles or other contaminants from entering the housing, in particular from entering a bearing that supports the rotary shaft. In said US patent application, the provided sealing ring comprises a first lip and a second lip that both extend from a ring base body. Both lips essentially extend radially inward from the ring base body whereby one lip has an increased elasticity compared to the other lip. The lips point in different axial directions so that one lip may be optimized to prevent lubricant from leaking and the other lip may be optimized to prevent contaminants from entering the housing.

Sealing rings, also known as radial shaft seals and/or lip seals are vital machine components used in applications where it is necessary to create a seal with the moving part such as a rotary shaft of a water pump or a gearbox. They are used to exclude or prevent contaminants from the surrounding environment from entering the housing or a bearing that supports the rotating shaft. Each lip of the sealing ring guarantees a constant contact with the rotating shaft by use of a defined radial load or pre-load. However, due to aging effects and wear this pre-load may decrease over time. In particular the wear may be increased if the rotary shaft is misaligned or inaccurately manufactured, for example. The sealing ring is able to compensate a runout of the rotary shaft to some degree and for some time but typically it requires a greater spring force to guarantee constant contact between the sealing ring and the rotary shaft all around its circumference. This additional force may be produced by a separate spring element. The pre-defined radial load or pre-load is then applied to the rotary shaft at any given time independent of its necessity. The constant increased pre-load leads to an increased wear and consequently a reduced service life.

SUMMARY

The sealing ring of the present disclosure includes a first lip and a second lip, wherein the sealing tips of both lips point at least in part in the same axial direction, and whereby the first lip surpasses the shorter second lip such that the sealing tip of the first lip is arranged axially distanced to the second lip. The sealing lips of the disclosed sealing ring therefore differ from the known prior art. Since the two lips of the sealing ring extend in the same axial direction, they are also elastically deformable in the same direction. The first lip surpasses the shorter second lip so that the free end of the first lip which provides the sealing tip is able to be pressed against the outer circumference of the rotary shaft by the pre-load of the first sealing lip. Both sealing lips, the first lip and the second lip, are designed such that they provide a wanted or desired radial pre-load onto the rotary shaft. In order to surpass the shorter second lip, the first lip is designed longer in its axial extension than the second lip with the consequence that the first lip is more deformable than the second lip. This leads to the advantage that the outer or first lip may absorb impact and deflect water, dust or debris that is projected from multiple directions from the outside environment onto the sealing ring. In particular, if a high-powered water beam is directed onto the sealing ring the first lip deforms without losing contact to the rotary shaft. On the contrary, due to the large or long design of the first lip which surpasses the shorter second lip, the first lip is deformed by the power of the water beams such that this effect is increased.

According to a preferred embodiment of the present disclosure the first and second lip enclose an angle of less than 50°, in particular 45° or less than 45° in their relaxed state. Preferably, the angle is between 25 and 45°. Preferably, the first lip is defined such that it encloses an angle of 40 to 50°, in particular 45° with the central rotating axis of the sealing ring.

The enclosed angle guarantees that a hollow space is provided between the sealing lips and the rotary shaft into which the outer or first lip may deflect into if being hit by a high-powered water beam from the outside. The first and second lip are designed such that the axial extension of the second lip corresponds to 20 to 30 percent of the total axial extension of the sealing ring, in particular of the ring base body and the first lip. In other words, the axial distance between the sealing tips of the first and the second lip to another corresponds to 60 to 80 percent, in particular to 70 percent, of the total height or axial extension of the ring base body and the first lip or the sealing ring.

It is preferred that the first lip comprises a radially outer surface and a radially inner surface, the outer surface extending along a curvature such that a cross-section of the first lip decreases towards the first sealing tip. In its cross-section the first lip therefore comprises a wedge-shaped design that allows a high stability as well as efficient elasticity of the first lip. Due to the curvature on the outside or the outer surface of the first lip a water beam or other particles or contaminants that are projected onto the outer surface of the sealing ring, in particular the first lip, are advantageously deflected from the first lip without the seal being broken.

Preferably, the first lip is designed to be bendable radially inward between the first sealing tip and the ring base body. The cross-section of this first lip is of such design that it may be bent in a concave manner so as to maintain the sealing contact to the rotary shaft if impacted from the outside.

It is furthermore preferred that the inner surface of the first lip may touch contact the shaft between the first sealing tip and the ring base body. Thus, the axial distance between the first tip and the second tip must be at least so far that the first lip may be bent radially inward far enough to touch contact the rotary shaft between the first tip and the ring base body on the second tip.

Furthermore, the ring base body preferably comprises a support protrusion that protrudes radially inward, whereby the second lip is arranged between the first lip and the support protrusion. While the first lip and second lip also act as support features for the sealing ring, the support protrusion's function is not to seal but to align and attach the sealing ring on the rotary shaft. Therefore, the support protrusion, as well as the second lip and first lip, extends over the whole circumference of the sealing ring. The elasticity of the support protrusion is essentially smaller than that of the first and second lip so as to guarantee a safe seat and in particular a fitting alignment of the sealing ring to or on the rotary shaft so that the second and first lip are evenly stressed during use, in particular with respect of the radial pre-load. The support protrusion preferably comprises a convex cross section that allows a safe and reliable alignment of the sealing ring on the rotary shaft.

Between the support protrusion and the second lip preferably a radial recess is provided in the sealing ring, in particular in the support base body, to receive grease material or lubrication material. This recess allows the storage of lubrication material during use and in particular before the assembly of the sealing ring on the rotary shaft. When the sealing ring is axially pushed onto the rotary shaft the lubrication or grease material that is previously applied in the recess is dragged with the sealing ring up to the position on the rotary shaft on which the sealing ring is arranged during use.

Preferably, each sealing tip is designed with a rounded edge in its cross section so that even if the respective sealing lip is deformed a ceiling touch contact between the sealing lip and the rotary shaft is guaranteed.

It is particularly preferred that the first tip and the second lip are at least essentially arranged on a front face of the base ring while the support element is provided on the radial inner surface of the base ring and that on a back face of the base ring, that faces away from the front face, a connecting element is provided that is designed to connect the sealing ring to a housing or bearing that preferably carries the shaft, so that the sealing ring could be pre-assembled onto a pre-existing housing, for example. The overall height of the sealing ring is preferably measured from the back face of the base ring to the first sealing tip in axial extension of the sealing ring. The connecting element is preferably in the form of a plug-in element that is designed to be inserted into a corresponding recess of the housing or bearing, in particular in a form-fitting and/or force-fitting manner. According to one preferred embodiment, the connecting element is designed as connecting ring that extends over the whole circumference of the sealing ring. According to another embodiment the connecting element is of a ring structure but is provided with, in particular, equally distanced openings or cut-sections so that neighbouring connecting element parts may be moved or deformed independently from one another. Also, the openings may be used as a rotation lock provided that the housing or bearing provides a corresponding protrusion that is insertable into the opening such that during use the sealing ring is locked on the housing in the circumferential direction in a form-fitting manner.

Preferably the sealing ring with the first lip, the second lip, the support protrusion and the connecting element is designed in one piece. This allows for easy assembly and cost-efficient manufacturing of the sealing ring.

BRIEF DESCRIPTION OF THE DRAWINGS

In the following the sealing ring is described in more detail with reference to the figures. To that regard FIGS. 4A to C show the sealing ring during use FIGS. 5A to D show steps of the assembly process of the sealing ring on a rotary shaft.

DETAILED DESCRIPTION

Figure 1:
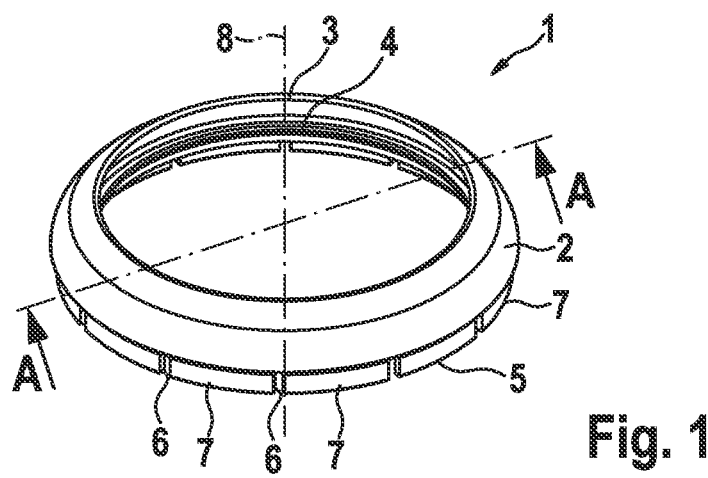
FIG. 1 shows a preferred sealing ring in a perspective view.

FIG. 1 shows in a perspective view a preferred embodiment of a sealing ring 1 that is designed to be arranged coaxially to a cylindrical element such as a rotating shaft of a gearbox, a pump device or the like. The sealing ring 1 is made of an elastically deformable material such as rubber or plastic. The sealing ring comprises a ring base body 2 that is designed as a closed ring with a given inner and outer diameter. On the base body 2 a first sealing lip 3, a second sealing lip 4 and a connecting element 5 are arranged. The sealing ring 1 is designed in one piece such that the lips 3, 4, the base body 2 and the connecting element 5 are made of the same material and designed as one single piece.

Figure 2:
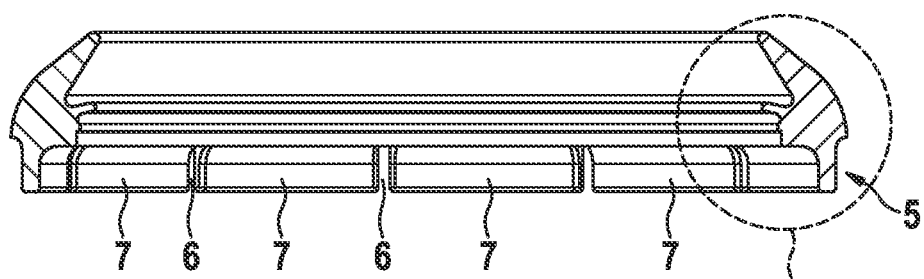
FIG. 2 shows the sealing ring in a cross-sectional view.

FIG. 2 shows the same sealing ring 1 in a cross-sectional view along the line A-A as drawn in FIG. 1. While the first lip 3 and second lip 4 extend across the whole circumference of the ring base body 2, the connecting element 5 of the present example is provided with equally distributed openings 6 that reach from the base body 2 in axial direction to the end of the connecting element 5 such that the connecting element 5 is divided by the openings 6 into a number of equally large connecting element parts 7. The connecting element 5 and the connecting element parts 7 are designed to be inserted into a respective recess of a housing that carries the rotary shaft. For that reason, the connecting element 5 extends in axial direction or parallel to the rotation axis 8 of the sealing ring 1. Since the connecting element parts 7 are separated from another, neighbouring connecting element parts 7 may be elastically deformed independent from one another. Furthermore, the openings 6 allow for a protrusion of the housing to be inserted between neighbouring connecting element parts 7 which provides a rotation lock between the housing and the sealing ring 1. According to an alternative embodiment, the sealing ring 1 may be provided with less or none of the openings 6 in the connecting element 5. The sealing ring 1 may also be provided without connecting element 5.

Figure 3:
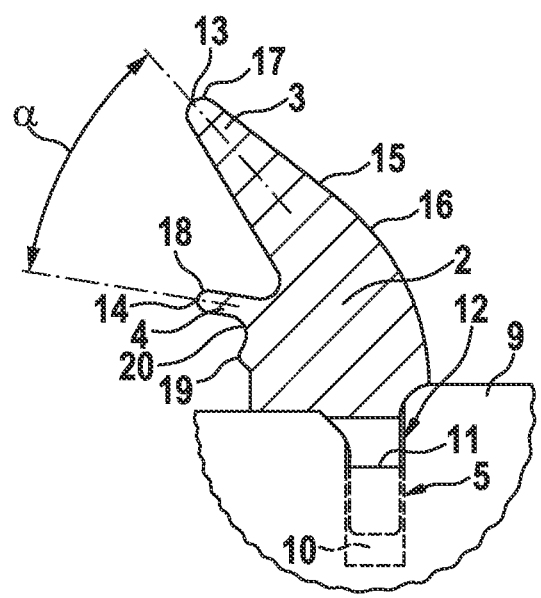
FIG. 3 shows the sealing ring in a detailed cross-section review.

FIG. 3 discloses a more detailed view of the sealing ring 1 according to the dashed circle B drawn in FIG. 2. FIG. 3 additionally shows an examplementary housing 9 with a recess 10 into which the connecting element 5 is inserted into. The recess 10 comprises a number of axial protrusions 11 corresponding to the number and arrangement of the openings 6 of the connecting element 5 so that the sealing ring 5 is connected to the housing by providing a rotation lock for the sealing ring 1, as described before.

The first lip 3 and the second lip 4 both extend at least in part in the same axial direction, in particular pointing away from the connecting element 5. The longer first lip 3 surpasses the shorter second lip 4 such that a first sealing tip 13 provided at the free end of the first lip 3 is axially distanced from a second sealing tip 14 provided at the free end of the second lip 4. Preferably, the distance of the first sealing tip 13 to the second sealing tip 14 corresponds to 60% to 80%, in particular 70%, of the overall height or axial extension of the sealing ring 1.

The first lip 3 and the second lip 4 are designed such that they enclose an angle α which preferably lies between 25° and 45°. Preferably, the first lip 3 encloses an angle of about 45° with the rotation axis 8, according to the present explementary embodiment.

Due to the design of the lips 3 and 4, a free space is provided between the lips 3 and 4. If mounted on the rotating shaft, this free space allows in particular the first lip 3 to be deformed or bent radially inward towards the outer circumference of the rotating shaft.

The first lip 3 comprises an outer surface 15 that is provided with a curvature 16 that reaches from the lip 3 to the ring base body 2. The curvature follows a given radius and increases the sealing ring's ability to seal the rotating shaft even under harsh conditions as will be explained in more detail below. The first lip 3 itself comprises a wedged-shaped cross section such that the thickness or width of the first lip 3 decreases towards the first sealing tip 13. The free end that provides the sealing tip 13 or the sealing tip 13 itself is provided with a rounded edge 17 that provides a safe seal with the rotating shaft independent of the deformation of the first lip 3.

The second lip 4 is also preferably provided with a rounded edge 18 on its free end which provides the sealing tip 14.

The ring base body 2 furthermore comprises a support protrusion 19 that extends radially inward from the ring base body 2. The support protrusion 19 is arranged such that the second lip 4 is arranged between the first lip 3 and the support protrusion 19. The support protrusion 19 extends less in a radial direction compared to the first lip 3 or the second lip 4. However, the support protrusion 19 is designed such that its elasticity is less than that of the lips 3 and 4 so that the support protrusion 19 is less likely to be deformed during use. The support protrusion 19 is provided to guarantee a safe and long-lasting alignment of the sealing ring 1 on the rotating shaft. Furthermore, it guarantees that the sealing ring 1 is safely arranged on the rotating shaft during the assembly of the sealing ring 1 on the rotating shaft.

Due to the advantageous design of the sealing ring 1 as described above it is well-suited for plastic injection processes utilizing a part injection or over moulding injection of a given elastomer.

Between the radial protrusion 19 and the second lip 4 a recess 20 is provided which is smaller than the recess or free space between the first lip 3 and the second lip 4. The recess 20 is designed as a receptacle for a lubrication or grease medium as further explained in more detail below.

The outer shape of the primary or first lip 3 absorbs and deflects water, dust or debris that is directly projected from multiple directions onto the sealing ring 2. The combination of a robust core provided by the ring base element 2 and the defective profile of the outer or first lip 3 enables the sealing ring to deflect and dissipate water that is directed onto the sealing ring 1 with high pressure, decomposing the energy in multiple directions. Additionally, the greater the pressure applied on the first lip 3 is the greater is the contact force provided by the lip against the rotating shaft.

FIGS. 4A to 4C show this effect for different situations. In FIG. 4A a water beam 23 is directed radially onto the outer surface of the sealing ring 2 so that it presses in particular the first and second lip against the outer surface 21 of a rotating shaft 22 on which the sealing ring 2 is mounted. The water beam 23, its pressure and direction of action are shown in FIGS. 4A to 4C by the use of arrows. The higher the pressure is the larger the arrow is drawn. If the water beam 23 is directed onto the end of the first lip 3 close to the ring base body 2, the more the first and second lips 3 and 4 are deflected or deformed.

In the situation of FIG. 4B the water beam 23 is oriented essentially in axial direction so that the water beam 23 hits the first lip 3 essentially in axial direction. Due to the length of the first lip 3, it still is deformed such that it increases the radial pressure onto the outer surface 21 of the rotating shaft 22 and thereby guarantees the tightness of the seal. The water beam 23 is deflected by the curvature and the overall design of the first lip 3 such that the pressure is reduced along the way and the water beam is deflected radially outward.

FIG. 4C shows a situation in which the direction of the water beam 23 is somewhere between the first direction shown in FIG. 4A and the second direction shown in FIG. 4B. Even in that situation the force of the water beam 23 advantageously distributed through the sealing ring 1 such that the first lip 3 and second lip 4 are safely pushed against the rotating shaft 22. The inner or second lip 4 in particular promotes different functions such as a secondary line of protection. It provides a seal even if the primary or first lip 3 should rupture or fail.

In addition, the radial protrusion 19 as main alignment feature provides optimal coaxial alignment upon assembly as shown in FIGS. 5A and 5D as well as absorption of vibrations from and to the element in contact, meaning from and to the rotating shaft 22 in the present example. The radial protrusion 19 is designed to provide a higher contact pressure to the rotating shaft 22. This higher contact pressure is, for example, realized by the contour of the radial protrusion 19 itself and/or by the difference between the outer diameter of the rotating shaft 22 in the area of contact and the inner diameter of the radial protrusion 19 in its relaxed state. The recess 20 facilitates the assembly to the shaft and improves the frictional wear protection. In particular, the recess allows the application of grease or grease like material, which then facilitates the assembly and improves frictional wear.

As shown in FIGS. 5A to 5D in which a mounting process or assembly process of the sealing ring 1 on the rotating shaft 22 is shown in four steps, the recess 20 helps to transport grease or other lubrication medium from the point of first contact between the sealing ring 1 and the rotating shaft 22 to its intended working position as shown in FIG. 5D. The second lip 4 helps to transport the medium 24 along the outer surface of the shaft to its final assembly position. The radial support protrusion 19 has the further advantage that it provides a robust fitting and alignment of the sealing ring 1 overall which allows more flexibility in the design of the primary and secondary contact areas provided by the first lip 3 and the second lip 4. This makes it possible to design the first and second lips 3, 4 such that they are optimally adapted to the run out or possible runout of the rotating shaft 22. This guarantees that even if a runout is present a constant contact between the first lip 3 and/or the second 4 is guaranteed without the usage of an external or supplemental spring element.

Since the contact between the first lip 3 and the rotating shaft 22 increases with the pressure applied to the first lip 3, for example by the water beam 23 as described before, the pre-load of the first lip 3 may be designed lower than before, thereby saving the sealing ring 1 from excessive wear due to high friction in the normal application or usage.

Figure 6:
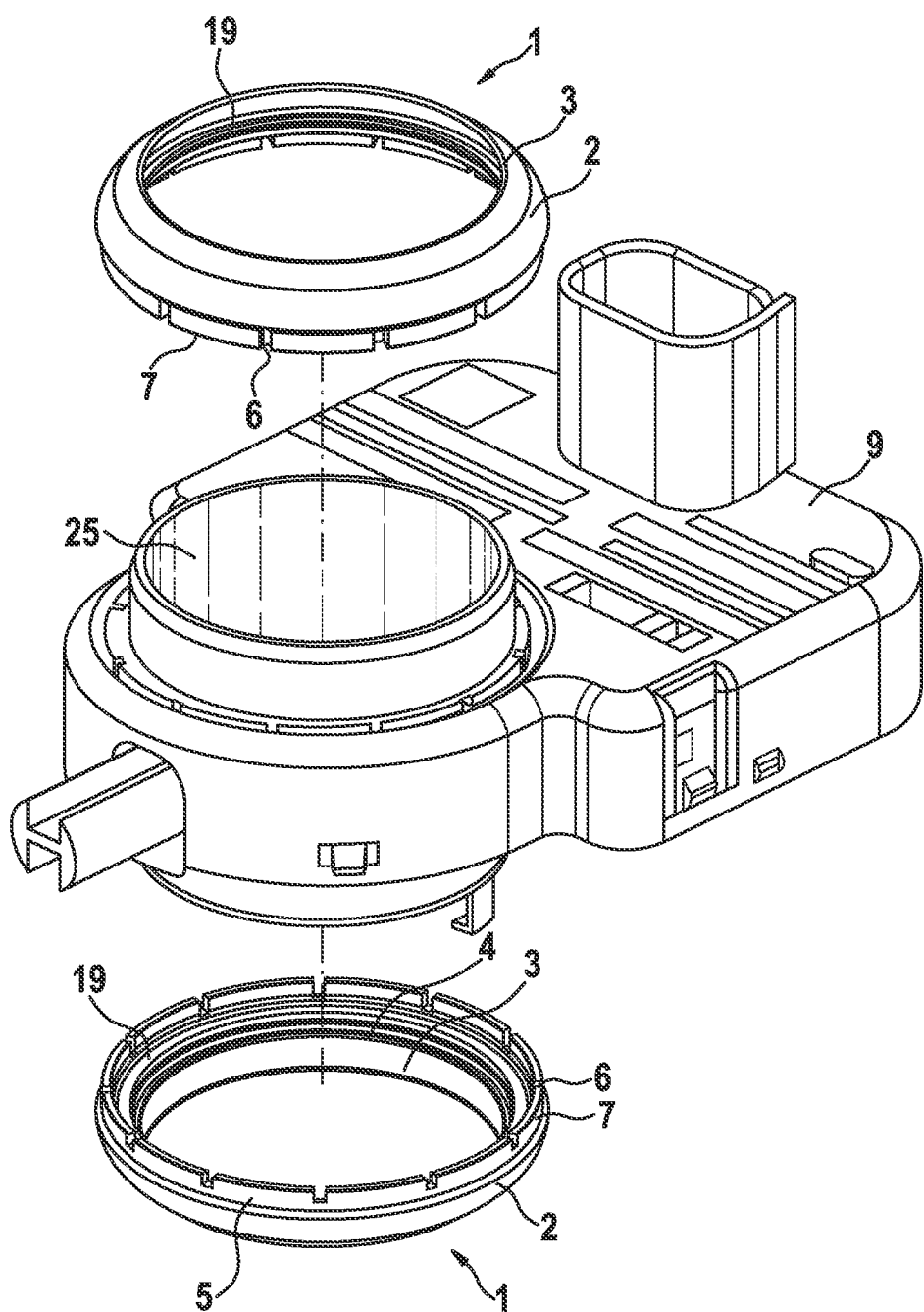
FIG. 6 shows an examplementary use case with the sealing ring.

FIG. 6 shows in the exploded state an arrangement comprising a housing 9 and two of the sealing rings 1. In this case the housing 9 is the housing of a steering wheel angle sensor or the like. The housing comprises a through opening 25 through which a steering shaft may be pushed through. From both ends of the housing one of the sealing rings 1 is attached to the housing so that no unwanted medium such as water or debris may enter the area between the sealing rings 1 and the housing 9 where the sensor operates. As shown in FIG. 6, the housing comprises multiple protrusions 11 which provide a rotating lock with the respective sealing ring 1, as described before. Optionally, a rotatable tubular like gear is provided in the opening 25. The steering shaft is then placed through the opening 25 and locked to the tubular gear, whereby the sealing rings 1 are placed on the housing 9 and in particular up against the tubular gear as the cylindrical element.

What is claimed is:

1. A sealing ring for radially engaging an outer surface of a cylindrical element, comprising:
   a ring base body having a central rotating axis; and
   a first lip and a second lip that each extend from the ring base body to sealingly engage the cylindrical element,
   wherein (i) the first lip includes a first sealing tip, and (ii) the second lip includes a second sealing tip,
   wherein the first sealing tip and the second sealing tip point at least in part in the same axial direction, and the first lip surpasses the second lip in an axial direction such that the first sealing tip of the first lip is arranged axially distanced to the second lip,
   wherein a first axis, extending through the first lip from said ring base body to said first sealing tip, and a second axis, extending through the second lip from said ring base body to said second sealing tip, subtend an angle of less than 90°, and
   wherein the ring base body comprises a support protrusion that protrudes radially inwardly so that the second lip is arranged between the first lip and the support protrusion.

2. A sealing ring for radially engaging an outer surface of a cylindrical element, comprising:
   a ring base body having a central rotating axis; and
   a first lip and a second lip that each extend from the ring base body to sealingly engage the cylindrical element,
   wherein (i) the first lip includes a first sealing tip, and (ii) the second lip includes a second sealing tip,
   wherein the first sealing tip and the second sealing tip point at least in part in the same axial direction, and the first lip surpasses the second lip in an axial direction such that the first sealing tip of the first lip is arranged axially distanced to the second lip,
   wherein the first lip comprises a radially extending outer surface and a radially extending inner surface,
   wherein the radially extending outer surface extends along a curvature such that a cross section of the first lip decreases from the ring base body towards the first sealing tip, and
   wherein the ring base body comprises a support protrusion that protrudes radially inwardly so that the second lip is arranged between the first lip and the support protrusion.

3. The sealing ring according to claim 1, wherein the first lip is designed to be bendable radially inward between the first sealing tip and the ring base body or the second sealing tip.

4. The sealing ring according to claim 1, wherein the base body defines a radial recess located between the support protrusion and the second lip.

5. The sealing ring according to claim 1, wherein the first sealing tip and the second sealing tip are each designed with a rounded edge in its respective cross section.

6. The sealing ring according to claim 1, wherein:
   the first lip and the second lip are at least essentially arranged on a front face of the base ring,
   the support protrusion is provided on the radial inner surface of the base ring,
   a connecting element is provided on a back face of the base ring that faces away from the front face, and
   the connecting element is designed to connect the sealing ring to a housing or bearing.

7. The sealing ring according to claim 6, wherein the first lip, the second lip, the support protrusion and the connecting element are designed in one piece with the ring base body.

8. The sealing ring according to claim 1, wherein the cylindrical element is a rotary shaft.

9. The sealing ring according to claim 2, wherein the first lip is designed to be bendable radially inward between the first sealing tip and the ring base body or the second sealing tip.

10. The sealing ring according to claim 2, wherein the base body defines a radial recess located between the support protrusion and the second lip.

11. The sealing ring according to claim 2, wherein the first lip, the second lip and the support protrusion extend in a radial direction and the support protrusion extends less in the radial direction compared to the first lip or the second lip.

12. The sealing ring according to claim 2, wherein:
   the first lip and the second lip are at least essentially arranged on a front face of the base ring,
   the support protrusion is provided on the radial inner surface of the base ring,
   a connecting element is provided on a back face of the base ring that faces away from the front face, and
   the connecting element is designed to connect the sealing ring to a housing or bearing.

13. The sealing ring according to claim 12, wherein the first lip, the second lip, the support protrusion and the connecting element are designed in one piece with the ring base body.

14. The sealing ring according to claim 2, wherein the first sealing tip and the second sealing tip are each designed with a rounded edge in its respective cross section.

15. The sealing ring according to claim 2, wherein the cylindrical element is a rotary shaft.

16. The sealing ring according to claim 2, wherein a first axis, extending through the first lip from said ring base body to said first sealing tip, and a second axis, extending through the second lip from said ring base body to said second sealing tip, subtend an angle of less than 90°.

17. The sealing ring according to claim 1, wherein the first lip, the second lip and the support protrusion extend in a radial direction and the support protrusion extends less in the radial direction compared to the first lip or the second lip.

* * * * *